(12) United States Patent
Kumar et al.

(10) Patent No.: US 8,020,203 B2
(45) Date of Patent: Sep. 13, 2011

(54) TECHNIQUES FOR HIGH AVAILABILITY OF VIRTUAL PRIVATE NETWORKS (VPN'S)

(75) Inventors: Chendil Kumar, Srikanteshwaranagar (IN); Premkumar Jothimani, Tamil Nadu (IN)

(73) Assignee: Novell, Inc., Provo, UT (US)

( * ) Notice: Subject to any disclaimer, the term of this patent is extended or adjusted under 35 U.S.C. 154(b) by 938 days.

(21) Appl. No.: 11/949,204

(22) Filed: Dec. 3, 2007

(65) Prior Publication Data

US 2009/0144817 A1 Jun. 4, 2009

(51) Int. Cl.
*G06F 15/16* (2006.01)
*G06F 15/177* (2006.01)

(52) U.S. Cl. .......................... 726/15; 709/221; 709/239

(58) Field of Classification Search .................... 726/15, 726/11, 12; 709/239, 249, 251, 220, 221
See application file for complete search history.

(56) References Cited

U.S. PATENT DOCUMENTS

| | | | |
|---|---|---|---|
| 6,092,200 A | 7/2000 | Muniyappa et al. | |
| 6,772,226 B1 | 8/2004 | Bommareddy et al. | |
| 6,978,364 B1 | 12/2005 | Balaz et al. | |
| 7,069,441 B2 | 6/2006 | Balaz et al. | |
| 7,100,046 B2 | 8/2006 | Balaz et al. | |
| 7,171,556 B2 | 1/2007 | Balaz et al. | |
| 7,689,722 B1 * | 3/2010 | Timms et al. | 709/249 |
| 2003/0088698 A1 | 5/2003 | Singh et al. | |
| 2004/0034702 A1 | 2/2004 | He | |
| 2004/0177157 A1 | 9/2004 | Mistry et al. | |
| 2004/0177281 A1 | 9/2004 | Balaz et al. | |
| 2005/0265308 A1 | 12/2005 | Barbir et al. | |
| 2006/0179298 A1 | 8/2006 | Balaz et al. | |
| 2006/0236378 A1 | 10/2006 | Burshan | |
| 2007/0113275 A1 * | 5/2007 | Khanna et al. | 726/15 |
| 2007/0258372 A1 | 11/2007 | Nadeau et al. | |

* cited by examiner

*Primary Examiner* — Edward Zee
(74) *Attorney, Agent, or Firm* — Schwegman, Lundberg & Woessner, P.A.

(57) ABSTRACT

Techniques for high availability of virtual private networks (VPN's) are provided. VPN gateways are organized as a virtual ring of VPN gateways. A client seeking to establish VPN communications with a destination resource is assigned one of the VPN gateways as a primary gateway and one VPN gateway as a secondary gateway. When a client's primary fails, the client seamless transitions to its designated secondary and the VPN gateways reconfigure themselves to account for the primary's failure.

3 Claims, 5 Drawing Sheets

TECHNIQUES FOR HIGH AVAILABILITY OF VIRTUAL PRIVATE NETWORKS (VPN'S)

BACKGROUND

Increasing the affairs of individuals and enterprises are being conducted in an automated manner over the Internet. Enterprises now engage in selling their products and services over the Internet; individuals also engage in communicating with one another over the Internet; employees may also engage in accessing secure resources of their employers over the Internet, etc.

One ever present and daunting issue with this activity is Internet security. Some transactions may be innocuous and may not require any substantial security. However, a growing number of transactions do involve sensitive material associated with enterprises and individuals, such as corporate secrets, personal data, etc. A variety of security mechanisms exist to address this issue.

For example, some enterprises may install dedicated connections for secure communications between parties. Yet, this approach is less pervasive with the advent of Virtual Private Network (VPN) techniques. A VPN permits an insecure connection to be used to achieve secure communications between parties engaged in a transaction.

VPN transactions use authentication and encryption techniques for purposes of ensuring that communications are secure. Essentially, a VPN permits insecure communications lines to be used in a secure manner.

In some cases, the servers or gateways that provide a VPN may go down and become unavailable to a user. When this occurs, a user is typically required to manually reconnect to an alternative VPN gateway, which is time consuming and which results in lost communications that occur when the user is unaware that his/her VPN gateway has in fact failed on him/her.

In other cases, the VPN gateway may not go down but may become heavily taxed such that a user experiences delayed responses from the VPN gateway. At the same time, other VPN gateways may have excess capacity. Thus, there is inefficient load balancing with VPN communications, which in turn effects how available a user perceives a particular VPN to be at any particular point in time.

Although a substantial amount of industry effort has been expended to provide load balancing and fail over support for databases and directories; there has been very little advancement and work in this area with respect to VPN communications.

Consequently, there is a need for improved techniques for delivering highly available VPN's.

SUMMARY

In various embodiments, techniques for high-availability of virtual private networks (VPN's) are provided. In an embodiment, a method for VPN failover access is provided. More specifically, a request is received from a client to establish a virtual private network (VPN) connection. Next, the client is authenticated and then the client is connected to a primary VPN gateway, which is selected in a round robin fashion from a virtual ring of VPN gateways. Connection information is then provided to the client that identifies a secondary VPN gateway, which is associated with the primary VPN gateway. Then, authentication information that is used to connect the client to the primary VPN gateway is also sent to the secondary VPN gateway, which is also part of the virtual ring. The authentication information is used by the client and the secondary VPN gateway to connect to one another when the primary VPN gateway becomes unresponsive.

DETAILED DESCRIPTION

Figure 1A:
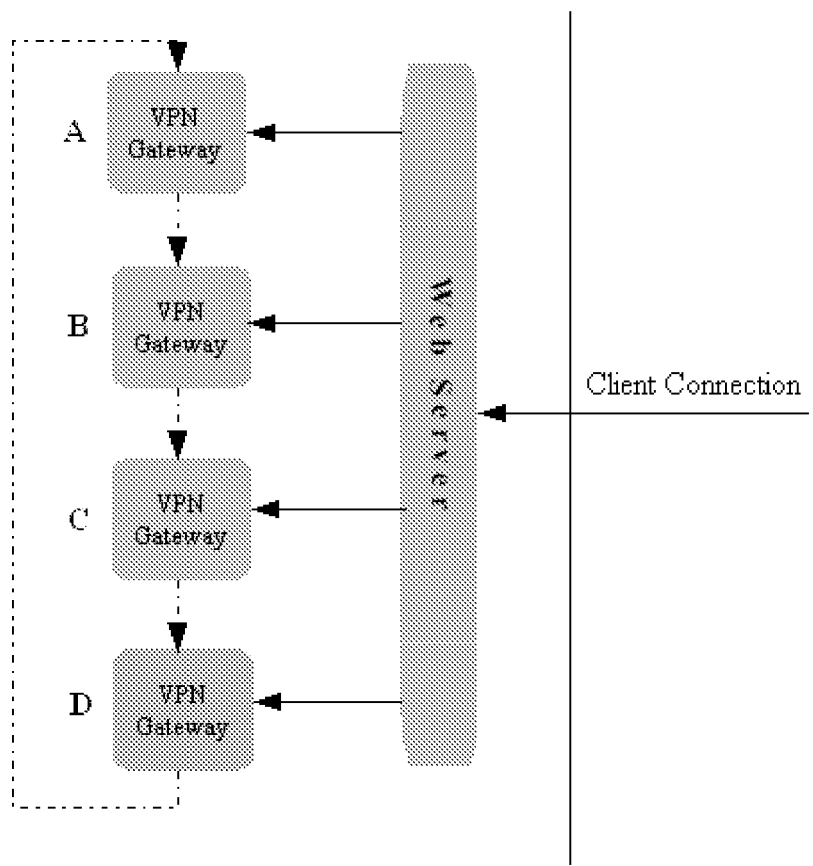
FIG. 1A is a diagram of an example layout for an architecture that provides virtual private network (VPN) failover access, according to an example embodiment.

A "resource" includes a user, content, a processing device, a node, a service, an application, a system, a gateway, a directory, a data store, a World-Wide Web (WWW) site, an end-user, groups of users, combinations of these things, etc. The terms "service," "module," and "application" may be used interchangeably herein and refer to a type of software resource that includes instructions, which when executed by a machine performs operations that change the state of the machine and that may produce output. Additionally, a "principal" is a type of resource that actively interacts with other resources. So, a principal may be a user or an automated service.

A "client" is an environment having one or more machines (processing devices, such as but not limited to a computer) that is enabled over a network and that includes resources and in some cases processes the resources. A "server" is also an environment having one or more machines that is enabled over a network and that includes resources and in some cases processes the resources. The terms "client" and "server" when used in combination define a client-server architecture, where the client and server are remote from one another over a network connection, such as a wide-area network (WAN) and insecure public communications network such as the Internet. Both a client and a server may be viewed as types of resources similar to what was described above with reference to the principal.

The term "remote" is used relatively herein. In other words, when the term "remote" is used as an adjective to a noun it is remote or external to some other entity being referenced within the context of the modified noun. So, as an example: a remote application to a service means that the remote application is external to a local environment and local network associated with the service. In other contexts, the service may be viewed as being remote to the application when it is expressed as: a remote service to an application. Within any given context herein, the term remote is used consistently to identify what entity is in fact remote to what other entity.

A "processing environment" refers to one or more physical processing devices organized within a network. For example, several computers connected via a local area network (LAN) may collectively be viewed as a processing environment. The processing environment also refers to software configurations of the physical processing devices, such as but not limited to operating system, file system, directory service, etc.

A "virtual private network (VPN)" is a special type of network that is carved out of or tunneled through another network, such as an insecure network like the Internet. Technically, a VPN does not have to have security features it can be any sub network that tunnels out specific traffic. However, as used herein the VPN uses security features, such as authentication so that secure communications occur via the VPN.

Various embodiments of this invention can be implemented in existing network architectures, storage systems, security systems, data centers, and/or communication devices. For example, in some embodiments, the techniques presented herein are implemented in whole or in part in the Novell® network, proxy server products, email products, operating system products, data center products, and/or directory services products distributed by Novell®, Inc., of Provo, Utah.

Of course, the embodiments of the invention can be implemented in a variety of architectural platforms, operating and server systems, devices, systems, or applications. Any particular architectural layout or implementation presented herein is provided for purposes of illustration and comprehension only and is not intended to limit aspects of the invention.

It is within this context, that various embodiments of the invention are now presented with reference to the FIGS. 1-4.

FIG. 1A is a diagram of an example layout for an architecture that provides virtual private network (VPN) failover access, according to an example embodiment. The architecture is presented by way of illustration and comprehension only and is not intended to limit embodiments presented herein.

It is also noted that although the diagram shows 4 VPN gateways any number of desired VPN gateways can be used, such that at a minimum 2 may be used and a maximum can be limited by hardware configurations and can thus be substantially more than 4 as shown in the FIG. 1A.

In the diagram, a webserver acts as an intermediary to a virtual ring of VPN gateways. Each VPN gateway provides gateway services for clients or principals via the clients to establish VPN communications with their desired destination resources. The virtual ring is organized as a circular linked list, such that the last VPN gateway D includes a link back to the first VPN gateway A.

A series of example processing, configuration, and scenarios are now presented in detail to illustrate the tenets of high-availability VPN gateway services.

Initial Configuration of the VPN Gateways by an Administrator

Each of the VPN Gateways (A-D) in the Virtual Ring are part of a group that shares common Traffic policies and each gateway can have different public Internet Protocol (IP) addresses and Transmission Control Protocol (TCP) Port usages; IP addresses (ranges/Subnet) are assigned to the clients.

An administrator can configure traffic policies, client integrity check policies, Distinguished Name Service (DNS) information and/or audit settings. Then, the administrator creates a group of Secure Socket Layer (SSL) VPN gateways and assigns the resulting configuration to the group. The public address on which each gateway listens and the virtual subnet pool is different for different gateways in the same group.

Moreover, each gateway has its own configuration file after the administrator creates the group of SSL VPN gateways.

VPN Gateway A is initialized with the following configuration file. The IP address in this configuration file is different from the one used by clients to connect to the VPN gateway. The VPN gateway listens for client connections using a public IP address. However, the communication for fail over/load balancing between the VPN Gateways happens using the private addresses of the protected network for which this virtual ring of VPN gateways provide access to. Thus, the configuration of VPN gateway A appears as follows:

IP Address of B: TCP Port of B
IP Address of C: TCP Port of C
IP Address of D: TCP Port of D VPN Gateway B will be initialized with the following configuration file.

IP Address of C: TCP Port of C
IP Address of D: TCP Port of D
IP Address of A: TCP Port of A VPN Gateway C will be initialized with the following configuration file.

IP Address of D: TCP Port of D
IP Address of A: TCP Port of A
IP Address of B: TCP Port of B VPN Gateway D will be initialized with the following configuration file.

IP Address of A: TCP Port of A
IP Address of B: TCP Port of B
IP Address of C: TCP Port of C Each Gateway stores its configuration file store as a circular linked list. Each node in the list has the following attributes.

1. IP address
2. Port
3. Status of the Gateway

The status of each gateway includes any of "UKNOWN", "CURRENT" or "DOWN". "UNKNOWN" is the default state when the list is first initialized. When a gateway is selected as the secondary, its state is set as "CURRENT". When a gateway is detected to be down, it is marked as "DOWN".

Balancing Load Across the Available Group of VPN Gateways

When users (principals) connect to the Web Server they are authenticated against a user store; upon successful authentication, they are connected to one of the available VPN Gateways in a round robin fashion. This ensures that all the available gateways are used equally. Also, balancing the load across the available gateways avoids gateway break downs due to overload.

In is noted that the Webserver can run on a separate machine or be part of the machine associated with one of the VPN gateways.

A Virtual Ring of VPN Gateways to Provide Active Fail Over Support

Again, VPN gateways configured by the administrator are setup as a virtual ring. In the virtual ring, every gateway serves as a secondary gateway to its left peer in the virtual ring. For example in FIG. 1A, VPN Gateway B serves as secondary to VPN Gateway A. Every gateway holds a circular linked list that depicts the virtual ring of available VPN gateways. The list is initialized by providing a configuration file to the gateways when they come up. Each gateway's configuration file contains IP address and TCP Port information of the peers from right to left. This list is generated automatically for each gateway based on the list of gateways configured by the administrator. (Refer to FIG. 1A for a pictorial representation of a VPN ring).

By setting up the gateways in the above described manner, at any point there exists one secondary device for every VPN gateway. Each gateway is a primary gateway and also acts as a secondary for its left peer in the virtual ring. In the FIG. 1A VPN Gateway C is a primary gateway selected through round robin fashion and also a secondary to gateway B.

Since one goal is to provide active fail over support, it is ensured that the packet loss when the fail over happens is kept to bare minimum. This is achieved by making sure that the client always has information about a primary VPN gateway and a secondary VPN Gateway. The primary gateway is the one which a client is currently connected to and the secondary gateway is the one which the client connects to if Primary fails.

Providing Fail Over Support with Minimal Data Loss

When the Primary gateway goes down, the client automatically connects to the secondary gateway (after a small delay) and continues to relay traffic to the VPN gateway. During this switch, clients are still asked to re-authenticate and renegotiate the keys required for encryption but in a manner transparent to the user. It is noted that just the keys are negotiated but other settings in the client workstation like routing table entries, virtual IP address assigned are kept unchanged. This makes sure that the time taken to switch to the secondary gateway is kept to a minimum.

This approach makes sure that there is minimum packet loss during a primary failure because of the following reasons
i. Since the secondary is closer to the primary gateway than the client, a secondary gateway is able to take evasive actions earlier than the client does. For packets that were already transmitted from the client but lost during the fail over, if the application uses TCP, then it will make sure that it resends the packets for which TCP ACK was not received.
ii. Since clients are aware of the primary and secondary gateway, clients make sure that packets are not being transmitted when the secondary is in the process if taking over from the primary.

The following details pertain to the initialization sequence of a VPN gateway and a VPN client, which includes steps specific to providing a highly available solutions.

Initialization Sequence of the VPN Gateway

When a particular VPN gateway comes up, it reads the fail-over configuration file, and stores as a list as described above with the section identified as "Configuration of the VPN Gateways by an Administrator." The statuses for each of the gateways in the list are initialized to "UNKNOWN" at the beginning. Each gateway starts connecting to each other gateway in the list until each gateway finds a running gateway. Once each gateway finds a running gateway, it exchanges information about its virtual subnet and marks it as secondary. Also the VPN gateways advertise routes for the virtual subnet they use by using any routing protocol like Routing Information Protocol (RIP), Open Shortest Path First (OSPF), etc. Once the initialization is complete, the VPN gateway is ready to provide VPN services to clients.

For example in FIG. 1A, the VPN Gateway D initializes by the reading configuration files and populating its circular linked list. The list initially looks like:
IP Address of A: TCP Port of A: UKNOWN
IP Address of B: TCP Port of B: UKNOWN
IP Address of C: TCP Port of B: UKNOWN D also publishes the route for its Virtual subnet through Routing protocols like RIP; OSPF (if 10.8.0.0/255.255.0.0 is the Virtual subnet address, then D publishes the route saying D is the next hop for packets with destination network 10.8.0.0/255.255.0.0). Then, D tries connecting to A (with the private IP address and Port information in the list) and if it finds that A is running, updates the status of in the list to CURRENT, otherwise D updates the status of A to DOWN and moves to the next entry in the list, that is B, and updates the status accordingly. Once D finds a Gateway running properly, it shares its virtual subnet information with that particular gateway. If A is running properly then D shares its virtual subnet information with A.

The circular linked list of D looks like the following if A is running properly:
IP Address of A: TCP Port of A: CURRENT
IP Address of B: TCP Port of B: UKNOWN
IP Address of C: TCP Port of C: UKNOWN Initialization Sequence of the VPN Client When a VPN client connects to the web server, after authentication, it is provided with information about the VPN gateway to which it should establish a tunnel. It then establishes the tunnel to the corresponding VPN gateway. During tunnel authentication and key negotiation, the VPN gateway sends the VPN client the IP address and port number of its secondary.

For example, in FIG. 1A when a client connects and authenticates to the Webserver. The Webserver sends the IP address and TCP Port of one of the VPN gateways based on round robin fashion, say D. Now, a client daemon in the VPN Client and a server daemon in the VPN Gateway D exchange a series of messages; authenticate mutually and exchange symmetric keys and form a secure tunnel. During this process the VPN Gateway D sends the information about its secondary Gateway (A) to the client, i.e. the IP address and the TCP port number on which A listens.

The following sections explain the process in various scenarios where the VPN gateways update the status of the circular linked list (virtual ring) and the corresponding VPN clients are notified of the secondary gateway just in case there is a failure.

Scenario 1: Gateway A Comes Up for the First Time (After All Other Gateways (B-D) are Already Up)

In this scenario after configuring the VPN gateways, an administrator starts all the gateways except one. The rest of the gateways are already serving the clients as described in earlier sections. When the last VPN gateway (D in this example) comes up for the first time it performs the sequence of steps as explained in the initialization sequence above. Thus, it looks for the first available VPN gateway to run as its secondary.

Before D Comes Up:
VPN Gateway A's Status List
IP Address of B: TCP Port of B:UP
IP Address of C: TCP Port of C:UNKNOWN
IP Address of D: TCP Port of D:UNKNOWN
VPN Gateway B's Status List
IP Address of C: TCP Port of C:UP
IP Address of D: TCP Port of D:UNKNOWN
IP Address of A: TCP Port of A:UNKNOWN
VPN Gateway C's Status List
IP Address of D: TCP Port of D:DOWN
IP Address of A: TCP Port of A:UP
IP Address of B: TCP Port of B:UNKNOWN VPN Gateway D comes up for the first time, it tries to find its secondary, which is A as per its configuration file. But, A is already serving as secondary to C.

So, when Gateway D finds a secondary gateway where that particular gateway is already serving as a secondary to a different gateway, the secondary (gateway A in this example) goes through the list of VPN gateway addresses to verify whether the newly connecting gateway has more priority (appears before the gateway for which it is currently serving as secondary when traversing the list in the reverse direction). If yes, A disconnects the connection with its current primary gateway and it will start serving as the secondary to the new VPN gateway (gateway D in this example). The other gateway (C), which has no secondary now, goes through its list and hits this VPN gateway, which has come up now and thus the gateway that comes up now serves as secondary to the gateway for which its secondary was serving previously i.e., in the above given example D starts serving as secondary to C. Once all this is done, all the gateways which received their secondary gateway change will notify their clients about the new secondary gateway using the tunnel's control channel.

The status list of all the VPN Gateways after D comes up is shown below.

After D Comes Up:
VPN Gateway A's Status List
IP Address of B: TCP Port of B:UP
IP Address of C: TCP Port of C:UNKNOWN
IP Address of D: TCP Port of D:UNKNOWN
VPN Gateway B's Status List
IP Address of C: TCP Port of C:UP
IP Address of D: TCP Port of D:UNKNOWN
IP Address of A: TCP Port of A:UNKNOWN
VPN Gateway C's Status List
IP Address of D: TCP Port of D:UP
IP Address of A: TCP Port of A:UNKNOWN
IP Address of B: TCP Port of B:UNKNOWN
VPN Gateway D's Status List
IP Address of A: TCP Port of A:UP
IP Address of B: TCP Port of B:UNKNOWN
IP Address of C: TCP Port of C:UNKNOWN
Scenario 2: Gateway A Goes Down When a gateway goes down, the following resources are affected.

1. Users (Principals such as automated services) Connected to the gateway: When a gateway goes down, it is detected by its secondary due to the breakage of connection with that failed gateway. The secondary gateway immediately starts to service clients with its primary gateway's subnet in addition to the existing virtual subnet that it uses. This is done by creating virtual devices for that subnet and publishing routes for that subnet to the protected network gateway. Meanwhile clients connect to this secondary gateway whose IP address is already notified to them. Clients do a minimal re-authentication and key negotiation as described above. After this, data packets start flowing through the secondary gateway. This gateway notifies its secondary gateway about the new subnets, which it is taking care of currently. This helps if this gateway also goes down, so that its secondary can handle all the three virtual subnets. This gateway also notifies the clients about its secondary gateway. One thing to note is that, even though the secondary gateway takes care of the primary's virtual subnet, it will always use its own virtual subnet to service new clients that connect to it. So, when all the clients that were taken up from the primary get disconnected, the secondary gateway will delete the virtual device corresponding to the primary VPN gateway. This makes sure that when the actual primary gateway comes up it takes very little time to come up.

2. Gateway to which this gateway was serving as the secondary The gateway to which this gateway was serving as secondary also realizes that its secondary has gone down. It will mark its secondary gateway as "DOWN" in its list. It will start connecting to gateways that are after the current secondary gateway in the list. Once it finds a secondary gateway, it will mark that gateway as its secondary and inform that gateway about its virtual subnet. Also, it notifies its client about the new secondary gateway through the tunnel's control channel.

Before C Goes Down:
VPN Gateway A's Status List
IP Address of B: TCP Port of B:UP
IP Address of C: TCP Port of C:UNKNOWN
IP Address of D: TCP Port of D:UNKNOWN
VPN Gateway B's Status List
IP Address of C: TCP Port of C:UP
IP Address of D: TCP Port of D:UNKNOWN
IP Address of A: TCP Port of A:UNKNOWN
VPN Gateway C's Status List
IP Address of D: TCP Port of D:UP
IP Address of A: TCP Port of A:UNKNOWN
IP Address of B: TCP Port of B:UNKNOWN
VPN Gateway D's Status List
IP Address of A: TCP Port of A:UP
IP Address of B: TCP Port of B:UNKNOWN
IP Address of C: TCP Port of C:UNKNOWN When C goes down D, which is its secondary takes over. D adds a virtual device for C's subnet and publishes the route for the subnet. The Clients connected to C now connect to D since they know that D is the secondary of C. They do a minimal re-authentication and key negotiation as described above. Hence, these clients send the packets to the destination through VPN Gateway D. Now, D notifies A of its additional Subnet address and it also notifies the clients about its secondary VPN gateway, i.e., A.

B detects that C has gone down, B starts the process of finding a secondary by traversing the list. So, D will be B's Secondary, and then B notifies its clients about the change in its secondary gateway.

After C Comes Down.
VPN Gateway A's Status List
IP Address of B: TCP Port of B:UP
IP Address of C: TCP Port of C:UNKNOWN
IP Address of D: TCP Port of D:UNKNOWN
VPN Gateway B's Status List
IP Address of C: TCP Port of C:DOWN
IP Address of D: TCP Port of D:UP
IP Address of A: TCP Port of A:UNKNOWN
VPN Gateway D's Status List
IP Address of A: TCP Port of A:UP
IP Address of B: TCP Port of B:UNKNOWN
IP Address of C: TCP Port of C:UNKNOWN
Scenario 3: A Gateway which Went Down Comes Up This case functions in the same way as described in scenario 1 above. In addition to this, when its secondary is servicing a few clients that should be handled by the new gateway that is starting, its secondary instructs the client to transparently reconnect to the newly come-up primary in a way similar to how it happens when a client reconnects to the secondary server when the primary goes down.

Before C Comes Up.
VPN Gateway A's Status List
IP Address of B: TCP Port of B:UP IP Address of C: TCP Port of C:UNKNOWN
IP Address of D: TCP Port of D:UNKNOWN
VPN Gateway B's Status List
IP Address of C: TCP Port of C:DOWN
IP Address of D: TCP Port of D:UP
IP Address of A: TCP Port of A:UNKNOWN
VPN Gateway D's Status List
IP Address of A: TCP Port of A:UP
IP Address of B: TCP Port of B:UNKNOWN
IP Address of C: TCP Port of C:UNKNOWN When the Gateway C comes up, it will try to connect to D as per the list. D receives this request and traverses the list in reverse direction and finds that C has more priority than B. It disconnects its connection with B and serves as secondary to C. B starts the process of finding its secondary by traversing the list and finds C as its secondary. B notifies its clients of the change in secondary gateway.

After C Comes Up.
VPN Gateway A's Status List
IP Address of B: TCP Port of B:UP
IP Address of C: TCP Port of C:UNKNOWN
IP Address of D: TCP Port of D:UNKNOWN
VPN Gateway B's Status List
IP Address of C: TCP Port of C:DOWN
IP Address of D: TCP Port of D:UP
IP Address of A: TCP Port of A:UNKNOWN
VPN Gateway C's Status List
IP Address of D: TCP Port of D:UP
IP Address of A: TCP Port of A:UNKNOWN
IP Address of B: TCP Port of B:UNKNOWN
VPN Gateway D's Status List
IP Address of A: TCP Port of A:UP
IP Address of B: TCP Port of B:UNKNOWN
IP Address of C: TCP Port of C:UNKNOWN FIGS. 1B though 4 are now discussed for purposes of illustrating various embodiments of the invention that can use the techniques and architecture, which was discussed above with reference to the FIG. 1A.

Figure 1B:
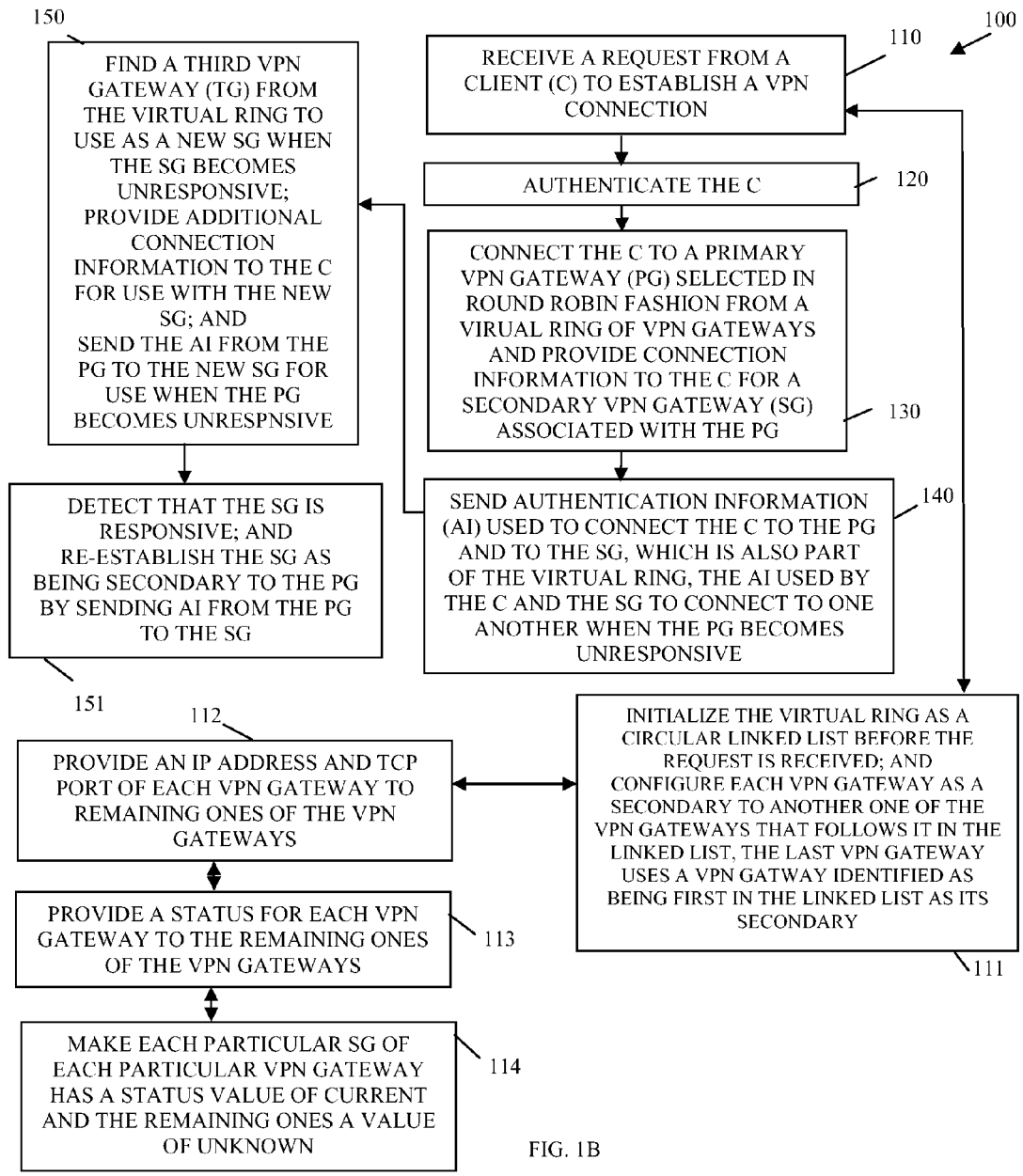
FIG. 1B is a diagram of a method for VPN failover access, according to an example embodiment.

FIG. 1B is a diagram of a method 100 for VPN failover access, according to an example embodiment. The method 100 (hereinafter "VPN gateway service") is implemented as instructions in a machine-accessible and readable medium. The instructions when executed by a machine (computer or processing device) perform the processing depicted in FIG. 1. The VPN gateway service is also operational over and processes within a network. The network may be wired, wireless, or a combination of wired and wireless.

The processing actions of the VPN gateway service may be viewed from the perspective of actions taken by a webserver and its VPN gateways, as presented above with reference to the FIG. 1A.

At 110, the VPN gateway service receives a request from a client to establish a VPN connection. The client (via a principal interacting on the client) desires a VPN with a particular resource. The VPN gateway service facilitates creating and establishing that VPN to the desired resource.

In an embodiment, the principal via its client uses a WWW browser to attempt to establish the VPN with a particular VPN gateway. As discussed above with reference to the FIG. 1A, the webserver intercepts this communication and assigns the client to a VPN gateway that can provide the VPN that the principal desires. This may or may not be the specific VPN gateway that the client initially requested because as was discussed above and again below, the VPN gateway service provides load balance for a pool of VPN gateways.

Prior to the processing at 110, and described at 111 (it is noted that the processing depicted in the FIG. 1B does not have to impart a particular processing sequence), the VPN gateway service initializes a pool of VPN gateways as a virtual ring of VPN gateways. This occurs before the client request is received to establish the VPN connection.

Essentially, two or more VPN gateways are configured in a circular linked list fashion with one another to create the virtual ring of VPN gateways. The upward limit on the number of VPN gateways available within the virtual ring is configured by an administrator and is limited only by hardware limitations of a particular processing environment that manages and assigns the VPN gateways to clients for their VPN's.

With the virtual ring of VPN gateways, each VPN gateway is configured to include a secondary VPN gateway, which is one that follows that particular VPN gateway within the circular linked list. The last VPN gateway in the list includes the first VPN gateway in the list as its secondary VPN gateway.

Additionally, at 112, the VPN gateway service provides each VPN gateway (by way of a configuration file) an IP address and TCP port number (for communication) for the remaining VPN gateways.

Still further, at 113, the VPN gateway service provides a status for each VPN gateway to the remaining ones of the VPN gateways. Also, at 114, the VPN gateway service ensures that each particular secondary gateway has a status value of "current" and marks the remaining status values for that particular VPN gateway's configuration file as being "unknown."

A detailed example of how the processing is done to configure the VPN gateways within the virtual ring was provided above with reference to the FIG. 1A.

Again, once the configuration of the virtual ring is achieved via the processing at 111-114, the VPN gateway service is equipped to receive a request from a client at 110 to establish a VPN connection.

At 120, the VPN gateway service authenticates the client/principal for access to a VPN gateway that the client/principal (herein after just "client") can use for establishing a VPN with a desired resource. Some specific example techniques for authenticating the client were discussed above with reference to the FIG. 1A.

Next, at 130, the VPN gateway service connects the client to a primary VPN gateway. The VPN gateway service selects the primary VPN gateway that the client uses in a round robin fashion from a virtual ring of VPN gateways. The VPN gateway service also ensures that connection information is provided to the client for a designated secondary VPN gateway, which is associated with the client's assigned primary VPN gateway.

At 140, the VPN gateway service authentication information (such as keys), which are used to connect the client to the primary VPN gateway and to the secondary VPN gateway. Again, the secondary VPN gateway is part of the virtual ring of VPN gateways. The keys (part of the authentication information) are also used by the client and the secondary VPN gateway to seamlessly and transparently connected to one another when or if the client's primary VPN becomes unresponsive. Essentially, the client and the secondary VPN gateway use the connection information and the authentication information to continue to provide VPN connectivity and communications should the primary VPN gateway fail in some manner.

According to an embodiment, at 150, the VPN gateway service finds a third and still different VPN gateway from the virtual ring to use as a new secondary VPN gateway when the existing primary VPN gateway detects that its secondary VPN gateway becomes unresponsive. Next, additional connection information is provided to the client for use with the newly designated secondary VPN gateway and the authentication information of all the connected clients of the primary gateway are sent from the primary VPN gateway to the new secondary VPN gateway. This procedure demonstrates how in an automated fashion the primary VPN gateway can reconfigure itself and automatically inform the client when the secondary VPN gateway fails in some manner so that the client is ensured of having a secondary VPN gateway for use at all times.

Continuing with the failure scenario of the secondary VPN gateway, at 151, and at some point in time thereafter, the VPN gateway service detects that the initially assigned secondary gateway becomes responsive again. In other words it comes back online for use within the virtual ring of VPN gateways. In response to this scenario, the VPN gateway service re-establishes the secondary VPN gateway that is now responsive as being its secondary by sending the authentication information back to the secondary VPN gateway.

The detailed processing that occurs for 150-151 was described above with reference to the FIG. 1A. The secondary VPN gateway when it comes back on line performs a variety of processing as does the primary VPN gateway and the client is informed of the change and re-supplied, if necessary, with the connection information of the secondary VPN gateway that is now back online.

The VPN gateway service can also perform a variety of other high-availability in the event of other scenarios, as were described in detail above with reference to the FIG. 1A.

Figure 2:
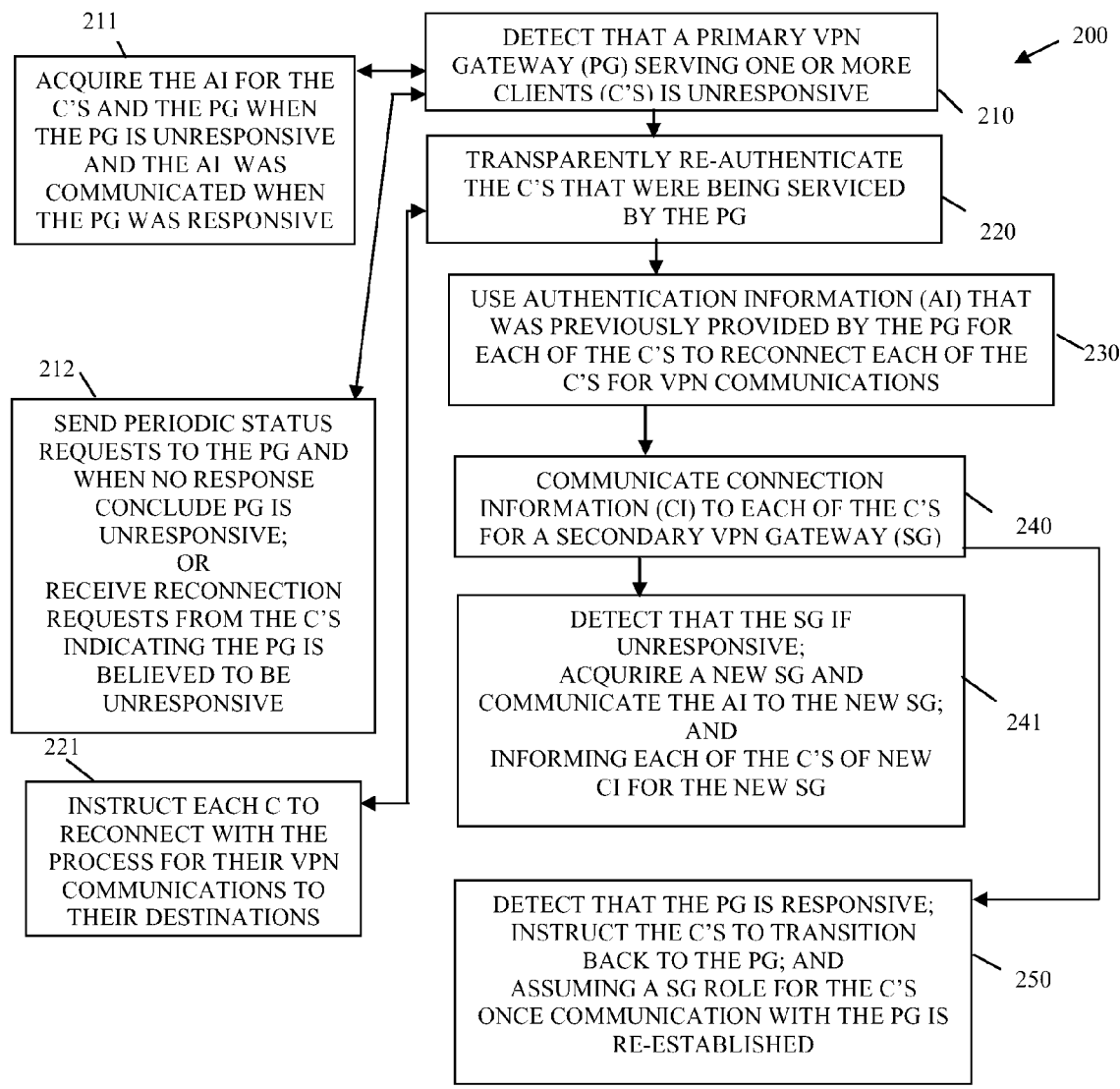
FIG. 2 is a diagram of another method for VPN failover access, according to an example embodiment.

FIG. 2 is a diagram of another method 200 for VPN failover access, according to an example embodiment. The method 200 (hereinafter "VPN failover service") is implemented in a machine-accessible and readable medium as instructions. The instructions when executed by a machine perform the processing depicted in the FIG. 2. Moreover, the VPN failover service is operational over a network, and the network may be wired, wireless, or a combination of wired and wireless.

In an embodiment, the VPN failover service is an enhanced perspective and in some ways alternative perspective to the VPN gateway service discussed in detail above with reference to the method 100 of the FIG. 1. Specifically, the VPN failover service provides the processing perspective from the point of view of current secondary VPN gateway that is servicing a client with VPN communications.

At 210, the VPN failover service detects that a primary VPN gateway for which the VPN failover service is acting as secondary becomes unresponsive. The primary VPN gateway is servicing one or more clients with VPN services and connectivity at the time when the VPN failover service detects that the primary VPN gateway has failed in some manner.

According to an embodiment, at 211, the VPN failover service had previously acquired the authentication information for the clients that were being serviced by the primary VPN gateway when failure was detected. That is, the authentication information was communicated to the VPN failover service when the primary VPN gateway was responsive. So, again the processing depicted in the FIG. 2 is not intended to impart any particular sequential ordering.

A variety of mechanisms can be used to detect when the primary VPN gateway becomes unresponsive.

For example, at 212, the VPN failover service can periodically send status or heartbeat requests to the primary VPN gateway and when the primary VPN gateway does not respond within a configurable period of time, the VPN failover service concludes that the primary VPN gateway has failed. The status or heartbeat requests can be sent from the VPN failover service or can be expected to be received at periodic intervals from the primary VPN gateway such that if one is not received the VPN failover service concludes the primary VPN gateway is down.

Another situation that can occur, at 212, is one in which the VPN failover service receives reconnection requests from the clients that the primary VPN gateway was servicing. This can also be used as an indication that the primary VPN gateway is believed to be unresponsive.

At 220, the VPN failover service transparently re-authenticates the clients that were being serviced by the now failed primary VPN gateway. Again, example techniques for achieving this re-authentication were described above with reference to the FIG. 1A.

In an embodiment, at 221, and once re-authentication is seamlessly and transparently achieved, the VPN failover service instructs each client to reconnect with the VPN failover service for their VPN communications to their destinations.

At 230, the VPN failover service uses the authentication information that was previously provided by the primary VPN gateway when it was responsive for each of the clients to reconnect for their VPN communications. Each particular client has its own set of authentication information that was negotiated when each client initially established its VPN communications through the now failed primary VPN gateway. This authentication information and client identifiers are known to the VPN failover service because when the primary VPN gateway was operational, the primary VPN gateway communicated the authentication information and client identifiers to the VPN failover service.

Next, at 240, the VPN failover service communicates connection information to each of the clients for a new secondary VPN gateway for the clients to use should the VPN failover service itself become unresponsive. This ensures that the clients always have a secondary VPN gateway to use should their existing primary VPN gateway (which is now the VPN failover service) fail. The VPN failover service also sends the client identifiers and authentication information to this new secondary VPN gateway.

According to an embodiment, at 241, the VPN failover service detects that the assigned secondary VPN gateway also becomes unresponsive. When this occurs, the VPN failover service acquires a new secondary VPN gateway; communicates the authentication information to that new secondary VPN gateway; and informs each of the clients of new connection information that they can use to contact this new secondary VPN gateway if the VPN failover service fails. Thus, the clients are assured of always having a secondary VPN gateway to use if their existing primary VPN gateway fails.

In an embodiment, at 250, the VPN failover service at some point in time detects that the failed primary VPN gateway has now become responsive (back on line for servicing VPN connections). In response to this, the VPN failover service instructs the clients to transition back to the primary VPN gateway and the VPN failover service again re-assumes a secondary VPN gateway role for the clients and the primary VPN gateway once communication between the clients and the primary VPN gateway are successfully re-established.

Again, more detailed processing associated with the VPN failover service was presented above with reference to the FIG. 1A.

Figure 3:
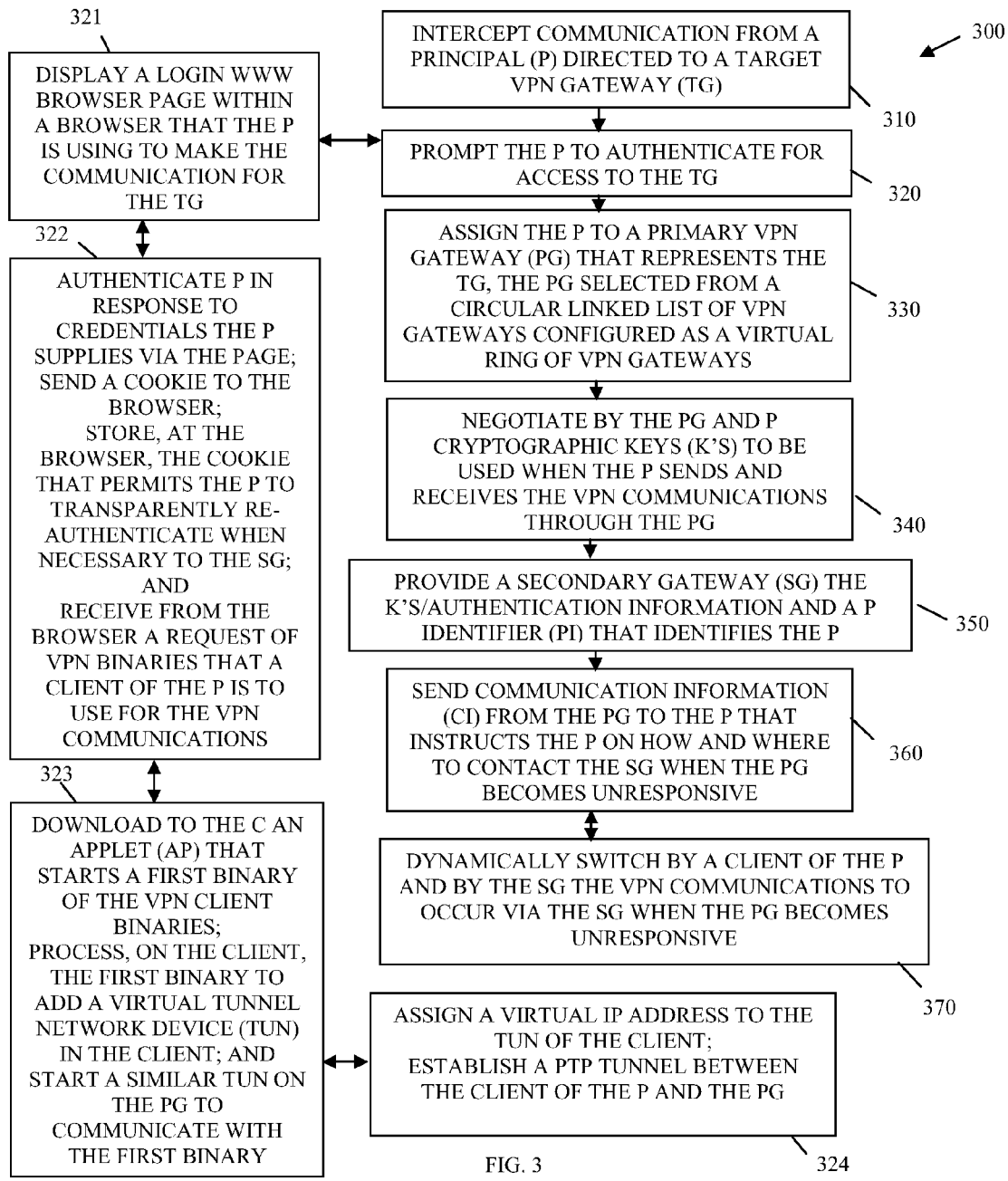
FIG. 3 is a diagram of yet another method for VPN failover access, according to an example embodiment.

FIG. 3 is a diagram of yet another method 300 for VPN failover access, according to an example embodiment. The method 300 (hereinafter "VPN high availability service") is implemented in a machine-accessible and readable medium as instructions. The instructions when executed by a machine perform the processing depicted in the FIG. 3. Moreover, the VPN high availability service is operational over a network, and the network may be wired, wireless, or a combination of wired and wireless.

The VPN high availability service represents alternative and in some cases enhanced processing associated with both the VPN gateway service represented by the method 100 of the FIG. 1 and the VPN failover service represented by the method 200 of the FIG. 2. The VPN high availability service represents the processing associated with the webserver and the virtual ring of VPN gateways as presented above with reference to the FIG. 1A.

At 310, the VPN high availability service intercepts communication from a principal that is being directed by the principal to a target VPN gateway. The client desires to establish VPN communications through the target VPN gateway to a desired or target resource identified by the principal.

In response to this intercepted communication, at 320, the VPN high availability service prompts the principal to authenticate for access to the target VPN gateway. This can be achieved in a number of ways.

For example, at 321, the VPN high availability service displays a login WWW page within a browser that the principal is using to make the communication for the target VPN gateway. At 322, the VPN high availability service authenticates the principal in response to credentials that the principal supplies via the WWW login page. Next, the VPN high availability service sends a cookie to the principal's browser. The browser on a client of the principal then is instructed to store the cookie; this permits the principal to transparently re-authenticate when it is necessary for the principal to transition to a secondary VPN gateway should the target or primary VPN gateway fail. The principal's browser then makes a request for VPN binaries that the client of the principal is to use for initially establishing VPN communications with the primary/target VPN gateway. At 323, the client downloads an applet that initiates and starts a particular first one of the VPN binaries on the client. That first binary processes to add a virtual tunnel device in the client. Next, a similar virtual tunnel device is started on the primary VPN gateway for purposes of communicating with the first binary and the virtual tunnel device of the client. At 324, a virtual IP address for the virtual tunnel device of the client is assigned and a point-to-point (PTP) tunnel between the client of the principal and the primary VPN gateway is established.

At 330, the VPN high availability service assigns the principal to a primary VPN gateway that represents the target VPN gateway requested by the principal via the communication. The primary VPN gateway is selected from a circular linked list of VPN gateways configured as a virtual ring of VPN gateways.

At 340, the principal and the primary VPN gateway negotiate cryptographic keys that are to be used when the principal sends and receives VPN communications through the primary VPN gateway.

At 350, a secondary VPN gateway (configured as such within a configuration file of the selected primary VPN gateway) is provided with the cryptographic keys and an identifier for the principal that is associated with the keys.

At 360, communication information is sent from the primary VPN gateway to the principal. The communication information instructs the principal and how and where (IP address, TCP port number, etc.) to contact the secondary VPN gateway when the primary VPN gateway becomes unresponsive.

According to an embodiment, at 370, the secondary VPN gateway and a client of the principal dynamically switch in real time the VPN communications to occur via the secondary VPN gateway when the primary VPN gateway becomes unresponsive.

Figure 4:
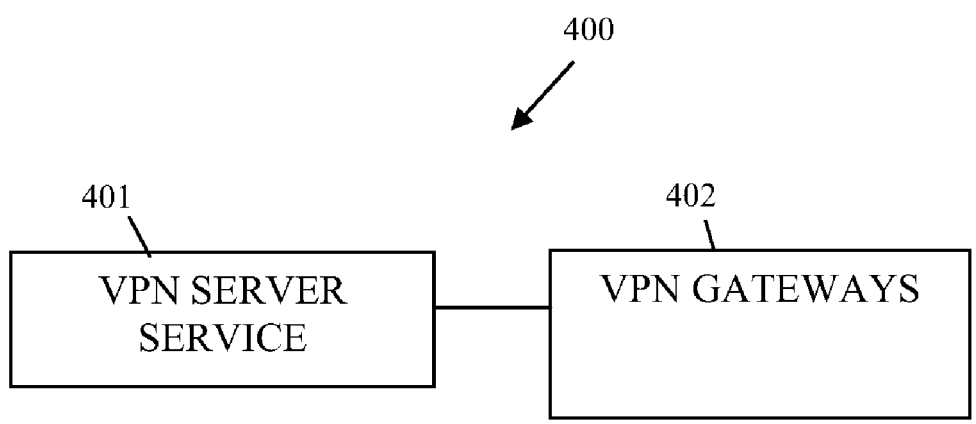
FIG. 4 is a diagram highly available VPN system, according to an example embodiment.

FIG. 4 is a diagram highly available VPN system 400, according to an example embodiment. The highly available VPN system 400 is implemented as instructions on or within a machine-accessible and readable medium. The instructions when executed by one or more machines perform, among other things, processing depicted with respect to the methods 100, 200, and 300 of the FIGS. 1-3, respectively. The highly available VPN system 400 is also operational over a network, and the network may be wired, wireless, or a combination of wired and wireless.

The highly available VPN system 400 includes a VPN server service 401 and a plurality of VPN gateways 402. Each of these and their interactions with one another will now be discussed in turn.

The VPN server service 401 is implemented in a machine-accessible and computer-readable medium and is to process on a server machine that is accessible via an Internet connection to clients of principals. Example processing associated with the VPN server service 401 was presented in detail above with reference to the FIGS. 1A, 1B, and 3.

The VPN server service 401 load balances VPN establishment requests from the clients by assigning each VPN request to a particular one of the VPN gateways 402. The VPN service 401 acts as a front-end load balancer for the VPN gateways 402. In an embodiment, the VPN server service 401 assigns each request using a round robin approach, so the VPN server service 401 serially traverses the VPN gateways 402 and assigns a next VPN gateway 402 to each incoming request. For example, if a first request was assigned to VPN gateway 402 A, then a next request is assigned to VPN gateway 402 B.

The VPN gateways 402 are implemented in a machine-accessible and computer-readable medium and are each to process on a different machine (processing device, computer, etc.). Each machine is in communication with the server machine that executes the VPN server service 401. Also, at least initially, each VPN gateway 402 is accessible to the clients and the principals via the VPN server service 401 over the Internet.

Example processing associated with the VPN gateways 402 and their initial configuration and techniques for configuration were described in detail above with reference to the FIGS. 1A, 1B, 2, and 3.

So, each VPN gateway 402 is configured to include an IP address and a TCP port communication number associated with remaining ones of the VPN gateways 402. Moreover, each VPN gateway 402 includes a secondary VPN gateway 402 selected from the remaining ones of the VPN gateways 402. Each client is assigned a particular VPN gateway 402, via the VPN server service 401, to act as that client's primary VPN gateway 402 and each client has connection information for a particular secondary VPN gateway 402 to use should a particular client's primary VPN gateway 402 fail or become unresponsive.

As described above in detail, the VPN gateways 402 are organized via their configuration files as a virtual ring of VPN gateways 402. This can be achieved by implemented a circular linked list approach, as discussed above in detail.

When a particular client's primary VPN gateway 402 becomes unresponsive that client seamlessly transitions to its correspondingly assigned secondary VPN gateway 402. The secondary VPN gateway 402 now becomes the client's new primary and the client also receives a new secondary VPN gateway 402. When the client's original primary VPN gateway 402 again becomes responsive, the client seamlessly transitions back to the primary and re-establishes the original secondary VPN gateway 402 as the client's secondary.

It is now appreciated how high-availability VPN gateway services can be implemented without transferring state information. That is, failover is achieved via configuration files and communicating authentication information but existing states (for example, cryptographic keys) of VPN gateways do not have to be managed and monitored and communicated. State synchronization/sharing is cumbersome and fraught with other problems and errors. The techniques of failover for VPN communications are achieved via communication of configuration information and key exchanges using a novel VPN gateway ring architecture, and done without the need of sharing state information.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

The Abstract is provided to comply with 37 C.F.R. §1.72(b) and will allow the reader to quickly ascertain the nature and gist of the technical disclosure. It is submitted with the understanding that it will not be used to interpret or limit the scope or meaning of the claims.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A machine-implemented method, comprising:
    receiving a request from a client to establish a virtual private network (VPN) connection;
    authenticating the client;
    connecting the client to a primary VPN gateway selected in a round robin fashion from a virtual ring of VPN gateways and providing connection information to the client for a secondary VPN gateway associated with the primary VPN gateway;
    sending authentication information used to connect the client to the primary VPN gateway and sending the authentication information to the secondary VPN gateway, which is also part of the virtual ring, wherein the authentication information is used by the client and the secondary VPN gateway to connect to one another when the primary VPN gateway becomes unresponsive;
    initializing the virtual ring of VPN gateways as a circular link list before the request is received; and
    configuring each VPN gateway to act as secondary to another one of the VPN gateways that follows it in the link list, wherein a last VPN gateway in the link list uses a first VPN gateway identified in the linked list as the last VPN gateway's secondary, providing an Internet Protocol (IP) address and a Transmission Control Protocol (TCP) port of each VPN gateway to remaining ones of the VPN gateways, providing a status for each VPN gateway to the remaining ones of the VPN gateways, and making each particular secondary VPN gateway of each particular VPN gateway have a status value of current and the remaining ones of the VPN gateways have status values of unknown.

2. The method of claim 1 further comprising:
    finding a third VPN gateway from the virtual ring to act as the secondary VPN gateway for the primary VPN gateway when the secondary VPN gateway becomes unresponsive;
    providing additional connection information to the client for connecting to the third VPN gateway; and
    sending the authentication information from the primary VPN gateway to the third VPN gateway to be used by the client and the third VPN gateway to connect to one another when the primary VPN gateway becomes unresponsive.

3. The method of claim 2 further comprising:
    detecting that the secondary VPN gateway is responsive; and
    re-establishing the secondary VPN gateway as being secondary to the primary VPN gateway by sending the authentication information for the connected client from the primary VPN gateway to the secondary VPN gateway.

* * * * *